US012631214B2

(12) United States Patent

Nagarajan et al.

(10) Patent No.: US 12,631,214 B2
(45) Date of Patent: May 19, 2026

(54) WHEEL HUB BEARING UNIT WITH OPTIMIZED POSITIONING OF OUTBOARD BALLS

(71) Applicant: AKTIEBOLAGET SKF, Gothenburg (SE)

(72) Inventors: Lokesh Nagarajan, Northville, MI (US); Nicholas J Maslany, Brighton, MI (US); Paolo A Re, Nichelino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 192 days.

(21) Appl. No.: 18/521,051

(22) Filed: Nov. 28, 2023

(65) Prior Publication Data

US 2024/0190174 A1    Jun. 13, 2024

(30) Foreign Application Priority Data

Dec. 7, 2022    (IT) ........................ 102022000025155

(51) Int. Cl.
 *F16C 19/49* (2006.01)
 *F16C 33/58* (2006.01)
(52) U.S. Cl.
 CPC .......... *F16C 19/497* (2013.01); *F16C 33/583* (2013.01); *F16C 2240/34* (2013.01); *F16C 2326/02* (2013.01)
(58) Field of Classification Search
 CPC .......................... F16C 19/497; F16C 2240/34; F16C 2326/02; B60B 27/0005; B60B 27/001;

(Continued)

(56) References Cited

U.S. PATENT DOCUMENTS 6,036,371 A    3/2000 Onose
7,104,695 B2 †  9/2006 Shevket
(Continued)

FOREIGN PATENT DOCUMENTS

AU    2004311585 B2    11/2008
JP    2007-303653 A  † 11/2007
(Continued)

OTHER PUBLICATIONS

Written Opinion and Search Report from the Italian Patent Office mailed May 31, 2023 in related application No. IT 102022000025155, and translation thereof.

*Primary Examiner* — Alan B Waits
(74) *Attorney, Agent, or Firm* — J-TEK LAW PLLC; Scott T. Wakeman; Mark A. Ussai

(57) ABSTRACT

A wheel hub bearing unit includes a hub rotatable about an axis and having a flange connectable with a wheel, an inner ball raceway and an inner roller raceway. An outer ring is connectable with the vehicle and disposed about the hub and has an outer ball raceway and an outer roller raceway. A plurality of balls roll upon the inner and outer ball raceways and a plurality of tapered rollers roll upon the inner and outer roller raceways. A contact angle between the balls and the ball raceways has a value between ten degrees and forty degrees. Each line extending through ball inner and outer contact points intersects with a line extending through a roller midpoint circle at a vertex, the vertex being spaced from a midpoint of a spacing line segment between ball and roller pitch circles by an axial distance of no greater than 7.5 millimeters.

9 Claims, 8 Drawing Sheets

(58) Field of Classification Search
CPC ............ B60B 2380/12; B60B 2380/14; B60B 2380/50
See application file for complete search history.

(56) References Cited

U.S. PATENT DOCUMENTS

| | | | |
|---|---|---|---|
| 7,950,858 B2 † | 5/2011 | Norimatsu | |
| 8,678,663 B2 * | 3/2014 | Ciulla | F16C 19/186 384/516 |
| 8,714,828 B2 † | 5/2014 | Ciulla | |
| 10,369,840 B2 * | 8/2019 | Sguotti | F16D 3/2245 |
| 10,780,735 B2 † | 9/2020 | Inoue | |
| 2005/0111771 A1 * | 5/2005 | Shevket | F16C 19/497 384/494 |
| 2007/0086687 A1 * | 4/2007 | Shevket | B60B 27/00 384/289 |
| 2008/0240635 A1 * | 10/2008 | Niebling | B60B 27/0005 384/416 |
| 2008/0310785 A1 * | 12/2008 | Niebling | F16C 19/185 384/548 |
| 2009/0003746 A1 | 1/2009 | Norimatsu et al. | |
| 2009/0046972 A1 | 2/2009 | Umekida et al. | |
| 2009/0052823 A1 | 2/2009 | Komori et al. | |
| 2009/0116779 A1 * | 5/2009 | Komori | F16C 33/64 384/589 |
| 2011/0069919 A1 | 3/2011 | Umekida et al. | |

FOREIGN PATENT DOCUMENTS

| | | | |
|---|---|---|---|
| JP | 2008-101651 A † | 5/2008 |
| WO | 2007052807 A1 | 5/2007 |

* cited by examiner
† cited by third party

WHEEL HUB BEARING UNIT WITH OPTIMIZED POSITIONING OF OUTBOARD BALLS

CROSS-REFERENCE

This application claims priority to Italian patent application no. 102022000025155 filed on Dec. 7, 2022, the entire contents of which are fully incorporated herein by reference.

BACKGROUND OF THE INVENTION

The present invention relates to bearings, and more particularly to wheel hub bearing units.

Wheel hub bearing units are generally known in the bearing and automotive industries and are used to rotatably couple wheels to vehicles, such as automobiles and trucks. A wheel hub bearing unit typically includes a cylindrical hub connectable with an axle, an outer ring disposed about the hub, and one or more rows or sets of rolling elements disposed between the hub and the outer ring. In certain constructions, the hub is rotatable about a central axis and includes a radial flange adapted to receive a wheel and the outer ring is fixedly connected with the vehicle, either to a steering knuckle or suspension component. In other configurations, the hub is mounted to a fixed shaft and the outer ring rotates about a central axis through the shaft and has a flange adapted to receive a wheel.

With either basic structure, a wheel hub bearing unit ordinarily includes two sets or rows of rolling elements, which may be balls, cylindrical rollers, tapered rollers, or any other appropriate type of rolling elements. When designing a wheel hub bearing unit for a specific application, consideration must be given to minimizing friction, providing sufficient structural rigidity to reliably support all anticipated loading, and reducing mass and space requirements for assembly in a vehicle.

SUMMARY OF THE INVENTION

The present invention includes a wheel hub bearing unit for rotatably coupling a wheel with a vehicle, the wheel being rotatable about a central axis. The wheel hub bearing unit comprises a hub rotatable about the central axis and having an outboard axial end, an inboard axial end and an annular flange extending radially outwardly from the outboard axial end and configured to connect with the wheel. The hub includes an outer circumferential groove providing a ball inner raceway and a frustoconical outer circumferential surface section spaced axially from the outer circumferential groove and providing a roller inner raceway. An outer ring is disposed about the hub and is configured to connect with the vehicle, the outer ring having an inner circumferential groove providing a ball outer raceway and a frustoconical inner circumferential surface section spaced axially from the inner circumferential groove and providing a roller outer raceway. A plurality of balls are disposed between the hub and the outer ring so as to be rollable upon the ball inner and outer raceways to traverse a pitch circle extending through the center of each ball and about the central axis. Each ball contacts the hub groove at an inner contact point and contacts the outer ring groove at an outer contact point, a line extending through each ball inner contact point and each ball outer contact point defining a ball contact angle with a line perpendicular to the central axis. A plurality of tapered rollers are disposed between the hub and the outer ring so as to be rollable upon the roller inner and outer raceways to traverse a pitch circle extending through a center of each roller and about the central axis. The roller pitch circle is spaced from the ball pitch circle by a spacing line segment along the central axis. Further, the inner and outer ball raceways are each configured such that the ball contact angle has a value between about ten degrees (10°) and forty degrees (40°). Additionally, the inner and outer ball raceways and the inner and roller outer raceways are each configured such that each line extending through the ball inner and outer contact points intersects with a line extending through the midpoint circle perpendicular to the roller outer raceway at a vertex. The vertex is spaced from a midpoint of the spacing line segment by an axial distance of no greater seven and one-half millimeters (7.5 mm).

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
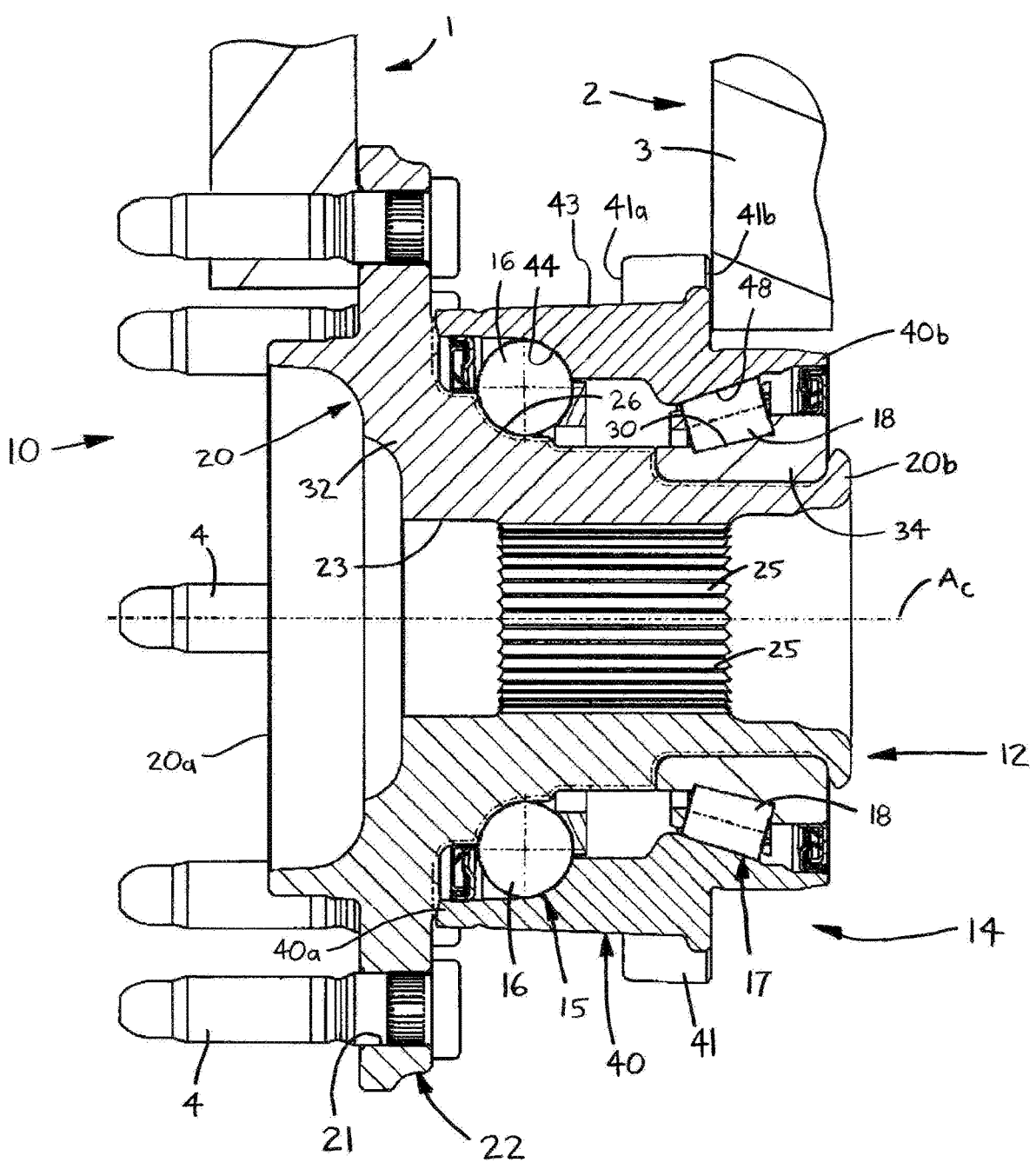
FIG. 1 is an axial cross-sectional view of a wheel hub bearing unit in accordance with the present invention, shown with broken-away, more diagrammatically depicted portions of a wheel and a vehicle.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. The terminology includes the words specifically mentioned above, derivatives thereof, and words of similar import.

Referring now to the drawings in detail, wherein like numbers are used to indicate like elements throughout, there is shown in FIGS. 1-8 a wheel hub bearing unit 10 for rotatably coupling a wheel 1 with a vehicle 2, particularly a steering knuckle or a suspension component (either being indicated by the same reference element 3), the wheel 1 being rotatable about a central axis $A_C$. The wheel hub bearing unit 10 basically comprises a hub 12 rotatable about the central axis $A_C$, an outer ring 14 disposed about the hub 12, a plurality or "row" 15 of balls 16 disposed between the hub 12 and the outer ring 14 and a plurality or "row" 17 of tapered rollers 18 disposed between the hub 12 and the ring 14 and spaced axially from the plurality of balls 16, the balls 16 and the rollers 14 rotatably coupling the hub 12 with the outer ring 14. The hub 12 and the outer ring 14 are configured, i.e., constructed, assembled, etc., so as to position the rolling elements 16, 18 in locations which optimize the performance of the wheel hub bearing unit 10, as discussed in detail below.

Figure 2:
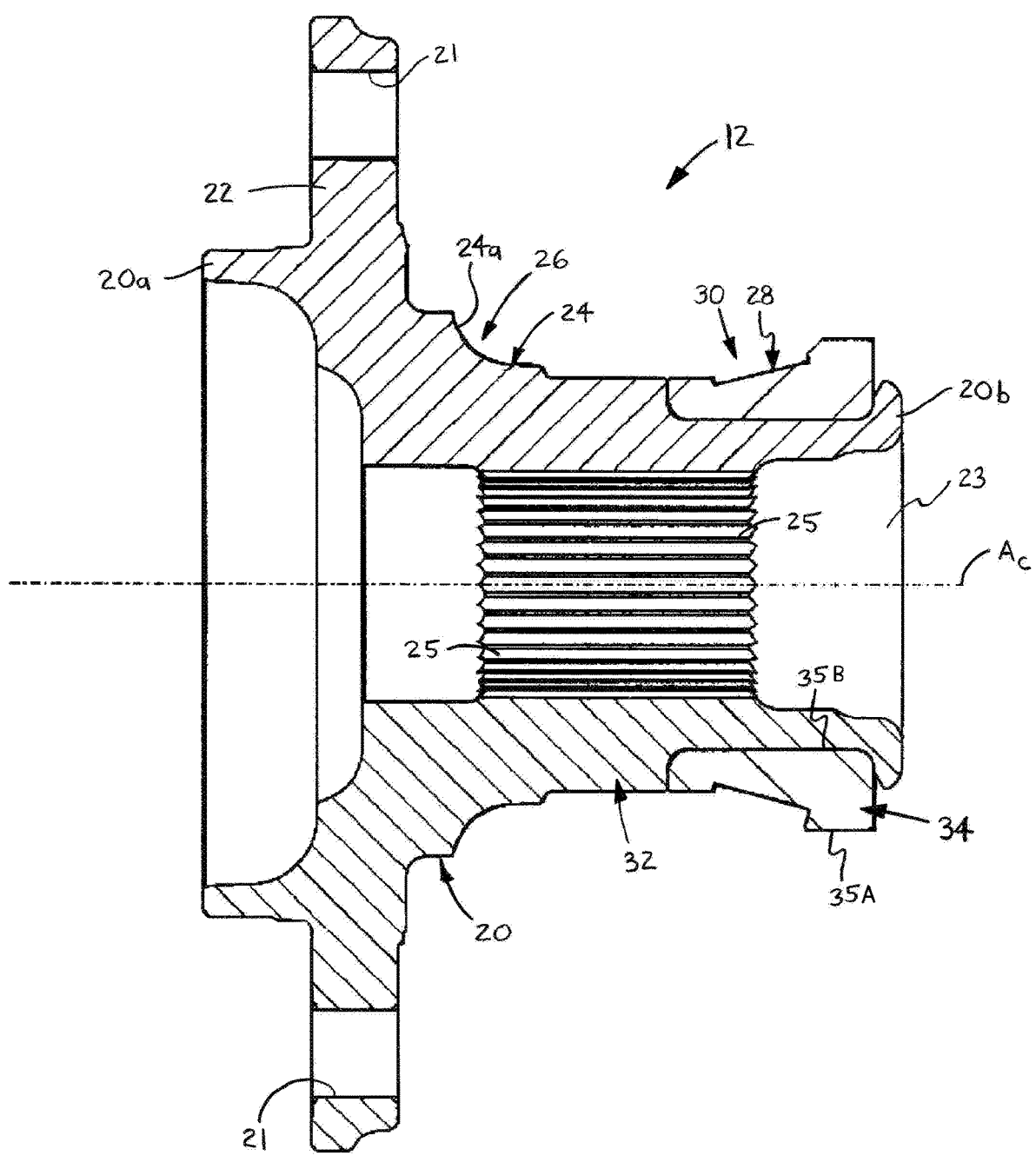
FIG. 2 is an axial cross-sectional view of an inner hub of the wheel hub bearing unit.

Referring to FIGS. 1 and 2, the hub 12 includes a generally cylindrical body 20 having an outboard axial end 20a, an opposing inboard axial end 20b and an annular flange 22 extending radially outwardly from the outboard end 20a. The hub flange 22 is configured to connect with the wheel 1, preferably by means of a plurality of fasteners 4 extending through holes 21 in the flange 22. The body 20 has an outer circumferential groove 24 providing an inner ball raceway 26 and a frustoconical outer circumferential surface 28 spaced axially from the outer circumferential groove 24 and providing an inner roller raceway 30. Preferably, the outer circumferential groove 24 has partially circular axial cross-sections and has a section 24a facing generally toward the inboard axial end 20b. Further, the frustoconical outer circumferential surface 28 preferably faces generally toward the outboard axial end 20a of the hub 12.

Further, the hub cylindrical body 20 preferably includes or is formed of a main body portion 32 and an annular ring 34 disposed about the main body portion 32 adjacent to the inboard axial end 20b. The annular ring 34 has an outer circumferential surface 35A including the outer frustoconical surface 28 providing the inner roller raceway 30 and an inner circumferential surface 35B providing a bore for receiving a portion of the main body portion 32. Furthermore, the hub body 20 preferably has an inner circumferential surface 23 defining a bore for receiving an axle (not shown) and a plurality of axial splines 25 formed in the inner surface 23 for engaging with mating splines of the axle.

Figure 3:
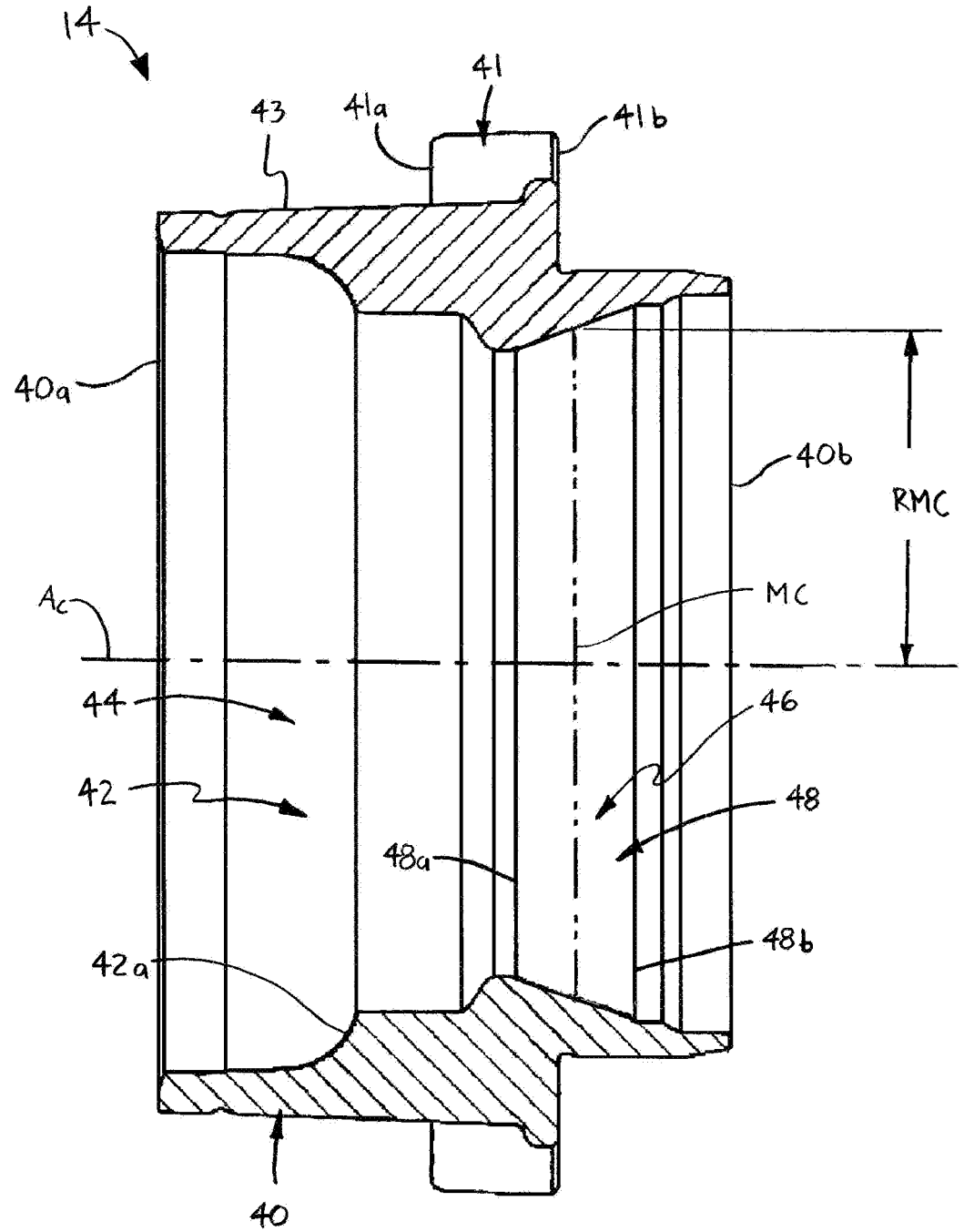
FIG. 3 is an axial cross-sectional view of an outer ring of the wheel hub bearing unit.

Referring to FIGS. 1 and 3, the outer ring 14 is configured to connect with the vehicle 2, preferably with a steering knuckle or suspension component 3, and includes a generally circular cylindrical body 40 with an outboard axial end 40a and an opposing inboard axial end 40b. Most preferably, the outer ring body 40 has at least one flange 41 extending radially outwardly from the outer circumferential surface 43, each outer ring flange 41 having outer and inner axial ends 41a, 41b and being configured to connect with a steering knuckle or a suspension component 3 by means of threaded fasteners (none shown). The outer ring cylindrical body 40 further has an inner circumferential groove 42 providing an outer ball raceway 44 and a frustoconical inner circumferential surface 46 spaced axially from the inner circumferential groove 42 and providing an outer roller raceway 48. When the outer ring 14 is disposed about the hub 12, the outboard end 40a of the ring 14 is disposed adjacent to the hub flange 22, the ring inboard end 40b is disposed adjacent to the hub inboard end 20b, the outer ball raceway 44 is disposed about the inner ball raceway 26 and the outer roller raceway 48 is disposed about the inner roller raceway 30.

Preferably, the inner circumferential groove 42 is spaced axially from and has a section 42a facing generally toward the ring outboard axial end 20a, and also facing toward the section 24a of the inner groove 24, and the frustoconical inner surface 46 is spaced axially from faces generally toward the ring inboard axial end 40b, and also faces toward the frustoconical outer surface 28. As such, the balls 16 and the rollers 18 are generally arranged in an O-type configuration when disposed on the raceway pairs 26, 44 and 30, 48, as is generally well known in the field of bearings. Further, the outer roller raceway 48 has first and second axial ends 48a, 48b and a midpoint circle 49 centered between the first and second axial ends 48a, 48b. The midpoint circle MC is a theoretical construct which indicates the path traversed by the center $C_{LC}$ of the line of contact $LC_O$ (FIG. 5) of each roller 18 on the outer raceway 48 as the rollers 18 circulate about the central axis $A_C$, as best shown in FIG. 3 and discussed in further detail below. The midpoint circle MC extends about the central axis $A_C$ and is spaced therefrom by a midpoint radius RMC.

Figure 4:
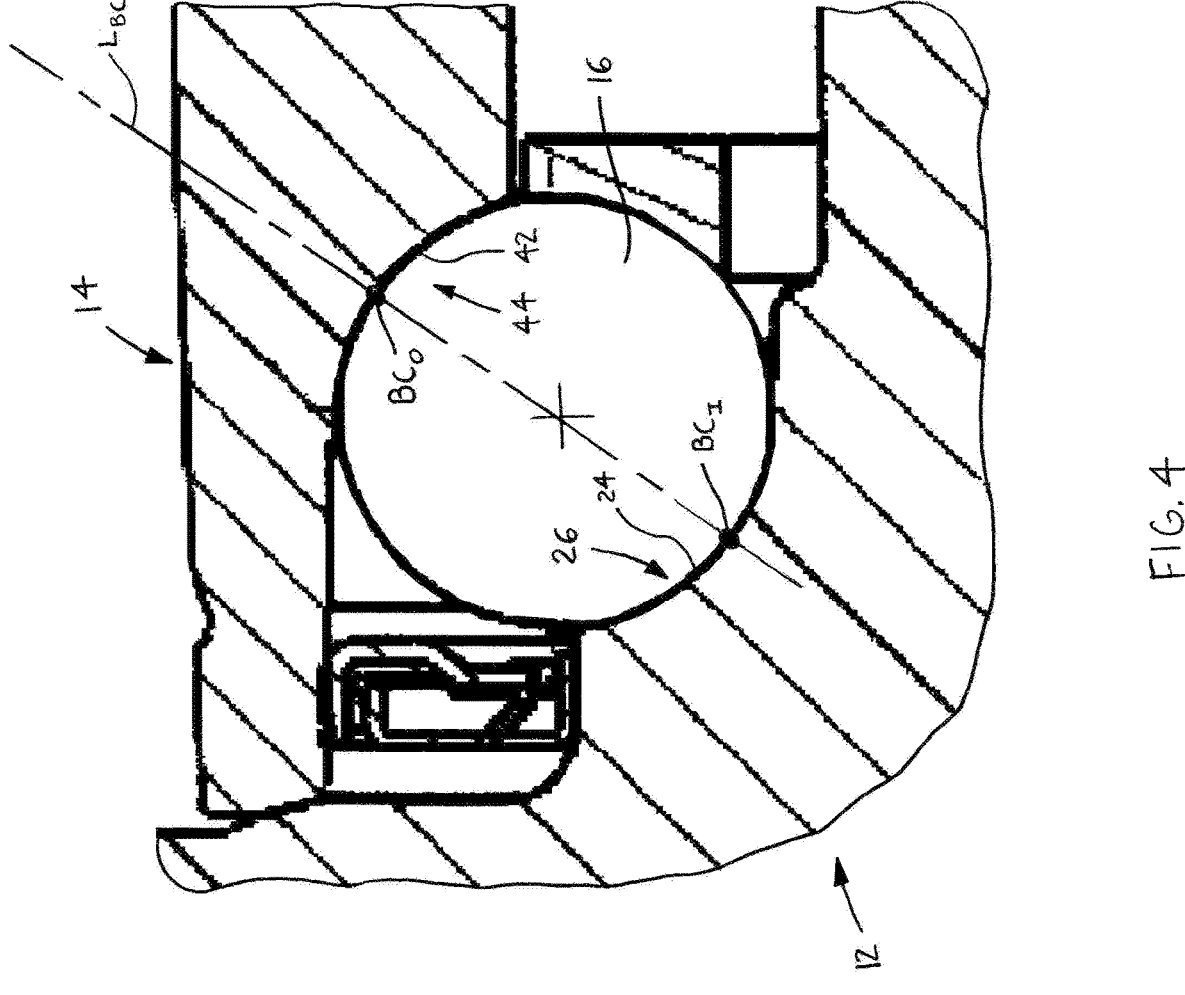
FIG. 4 is a more enlarged, broken-away axial cross-sectional view of one ball and portions of the ball raceways of the wheel hub bearing unit.
Figure 5:
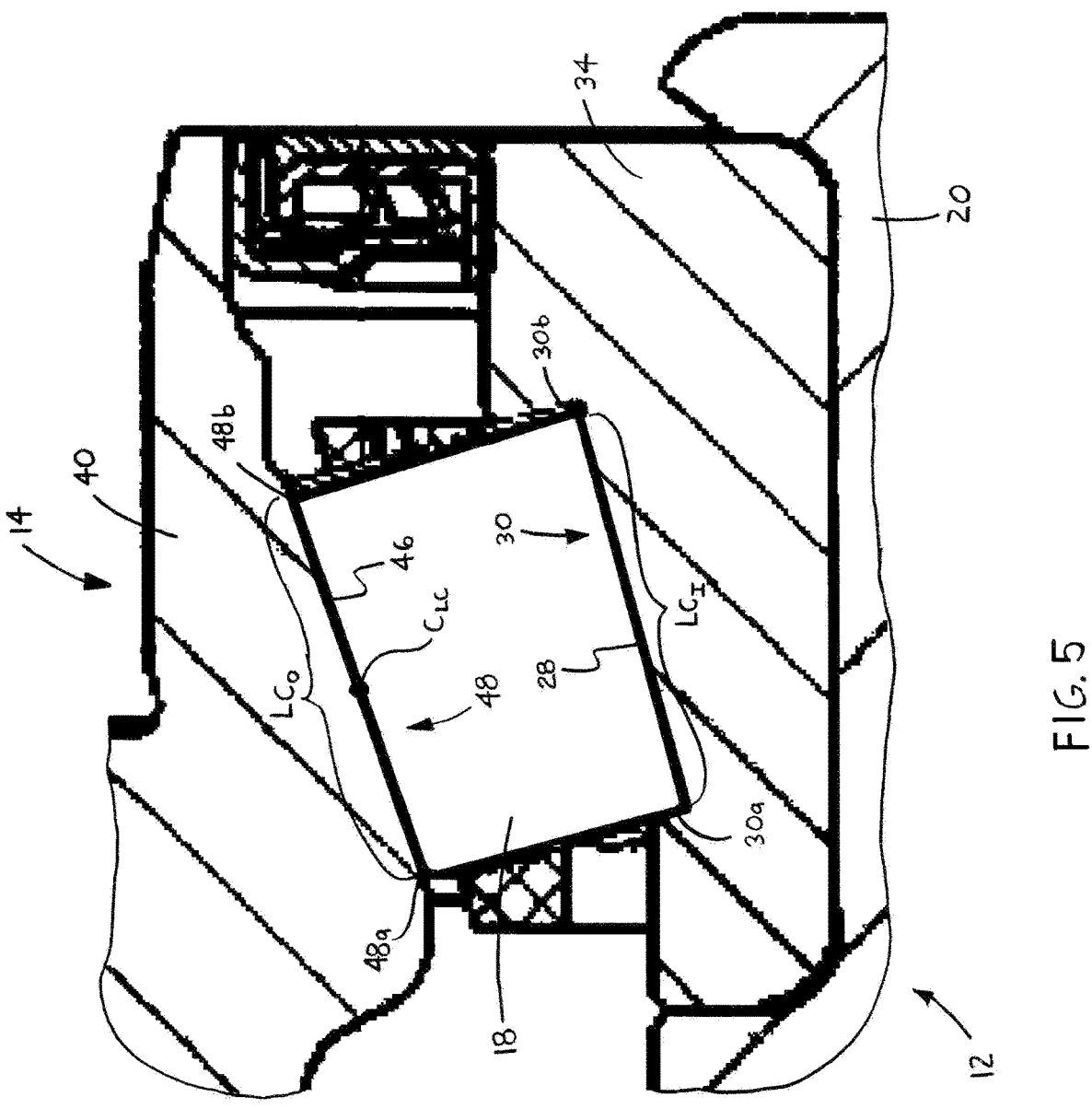
FIG. 5 is a more enlarged, broken-away axial cross-sectional view of one roller and portions of the roller raceways of the wheel hub bearing unit.

Referring now to FIGS. 1, 4 and 6-8, the plurality of balls 16 are disposed between the hub 12 and the outer ring 14 and are spaced circumferentially about the central axis $A_C$. The balls 16 are simultaneously rollable upon the inner ball raceway 26 and the outer ball raceway 44 when the hub 12 rotates about the central axis $A_C$. Specifically, during rotation of the hub 12, the balls 16 traverse a theoretical pitch circle BPC extending through the center of each ball 16 and about the central axis $A_C$, the pitch circle BPC having a radius RBP about the axis $A_C$. As shown in FIG. 4, the ball raceways 26, 44 are configured such that each ball 16 contacts the ball inner raceway 26 at an inner contact point $BC_I$ and simultaneously contacts the ball outer raceway 44 at an outer contact point $BC_O$, the specific portions of each ball 16 contacting the raceways 26, 44 continuously changing during the rolling motion of the balls 16. Each line $L_{BC}$ extending through a ball inner contact point $BC_I$ and through a ball outer contact point $BC_O$ defines a ball contact angle $\alpha B$ with a line perpendicular $L_{BC}$ to the central axis $A_C$, as discussed in further detail below.

Further, the plurality of tapered rollers 18 are disposed between the hub 12 and the outer ring 14 and are spaced circumferentially about the central axis $A_C$. The rollers 18 are rollable simultaneously upon the inner roller raceway 30 and the outer roller raceway 48 operate function with the balls 16 in rotatably coupling the hub 12 and the outer ring 14. As with the balls 16, the rollers 18 similarly traverse a theoretical pitch circle RPC through the geometric center of each roller 16, the roller pitch circle RPC having a radius RRP about the central axis $A_C$ and the roller pitch circle RPC being spaced from the ball pitch circle BPC by a spacing line segment $LS_S$ along the central axis $A_C$. As discussed above and shown in FIG. 5, each roller 18 simultaneously contacts the outer raceway 48 along a contact line $LC_O$ extending axially between the axial ends 48a, 48b of the raceway 48, as well as contacting the inner raceway 30 along a contact line $LC_I$ extending axially between the axial ends 30a, 30b of the raceway 30.

Figure 6:
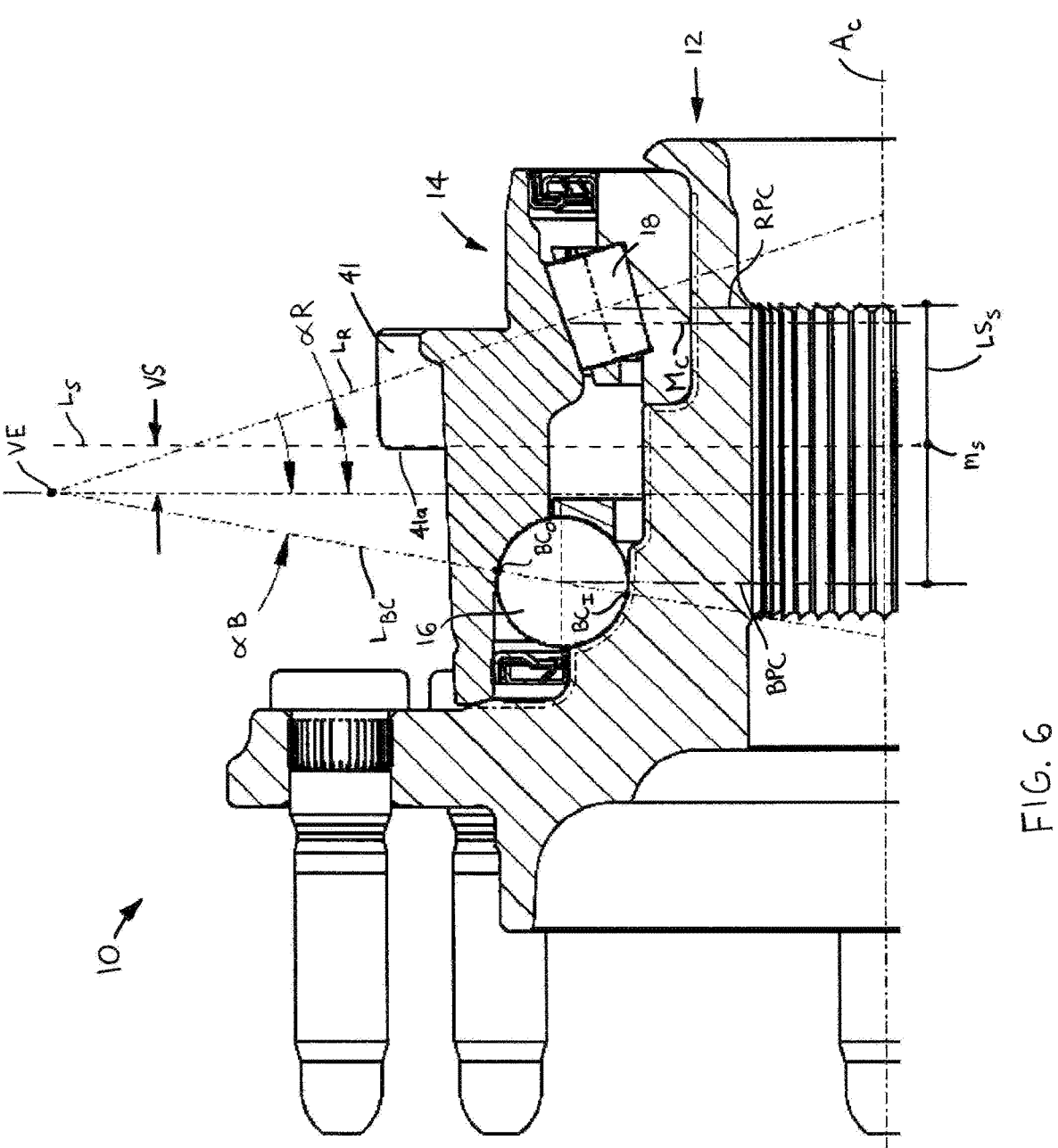
FIG. 6 is a broken-away, enlarged axial cross-sectional view of an upper portion of the wheel hub bearing unit, shown with the row of balls arranged at a first boundary of a preferred arrangement.
Figure 7:
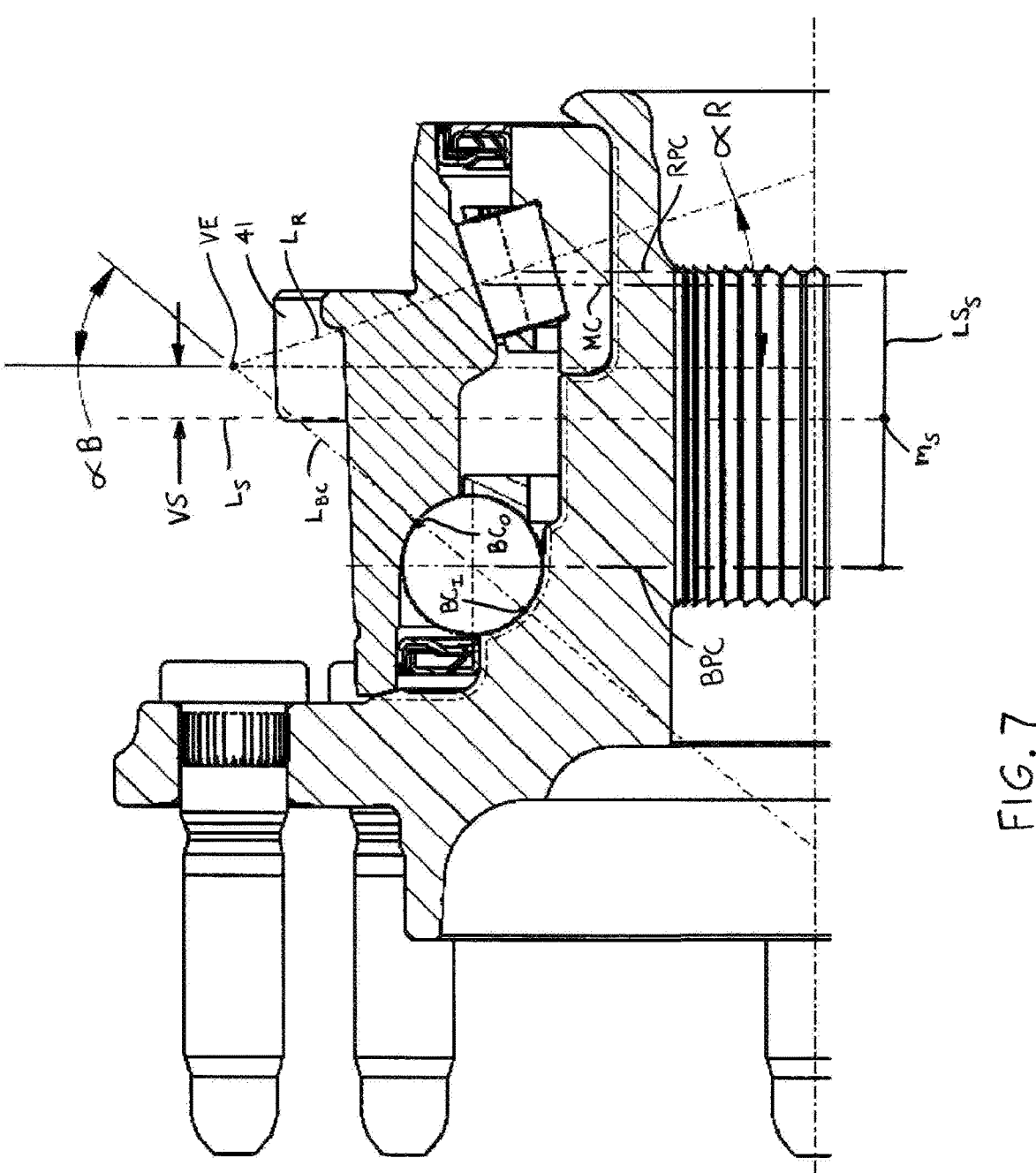
FIG. 7 is another broken-away, enlarged axial cross-sectional view of an upper portion of the wheel hub bearing unit, shown with the row of balls arranged at a second boundary of the preferred arrangement.

Referring now to FIGS. 6 and 7, to optimize the performance of the wheel hub bearing unit 10, the hub 12 and the outer ring 14 are formed or constructed to position the balls 16 in a manner that has been determined to best balance considerations of friction on the rolling elements 16, 18 and the stiffness, mass and fatigue life of the wheel hub bearing unit 10. Specifically, the inner and outer ball raceways 26, 44 are each configured such that the ball contact angle αB has a value between ten degrees (10°) and forty degrees (40°). Additionally, the inner and outer ball raceways 26, 44 and the inner and roller outer raceways 30, 48 are configured such that each line L$_{BC}$ extending through the ball inner and outer contact points BC$_I$, BC$_O$ intersects with a line L$_R$ extending through the roller midpoint circle MC perpendicular to the roller outer raceway 48 at a rolling element intersection vertex VE, the vertex VE being spaced from a midpoint ms of the spacing line segment LS$_S$ by an axial distance VS of no greater than seven and one-half millimeters (7.5 mm), i.e., plus or minus seven and one-half millimeters (+/−7.5 mm).

Most preferably, the axial spacing distance VS is related to the ball contact angle αB such that, for a particular value of the ball contact angle αB, the vertex axial spacing distance VS may be calculated as follows:

$$VS = \left[ \frac{RBP - RRP + \left( LS \times \tan\left( \frac{\pi}{2} - \alpha R \right) \right)}{\tan\left( \frac{\pi}{2} - \alpha B \right) + \tan\left( \frac{\pi}{2} - \alpha R \right)} \right] - \frac{LS}{2}$$

The above equation was discovered by the inventors of the present invention as a novel mechanism for expressing the relationship between the various dimensional parameters of the hub bearing unit 10 incorporated within this mathematical formula, and is a useful tool for designing such bearing units. More specifically, this formula may be used by a bearing manufacturer to test and to produce the wheel hub bearing units 10 with a greater reliability by reducing the testing phase and the samples needed to validate these products.

When using the above formula to calculate the value of the vertex axial spacing distance VS, the vertex VE is spaced from the spacing line segment midpoint ms in a direction toward the rollers 18 when the value of VS is positive and is spaced from the spacing line segment midpoint ms in a direction toward the balls 16 when the value of VS is negative. Further, the wheel hub bearing unit 10 is preferably configured or constructed such that, as the ball contact angle αB approaches a value of ten degrees (10°), the vertex axial spacing distance VS approaches a value of negative seven and one-half millimeters (−7.5 mm), as depicted in FIG. 6, and conversely, as the ball contact angle αB approaches a value of forty degrees (40°), the vertex axial spacing distance VS approaches a value of positive seven and one-half millimeters (+7.5 mm), as shown in FIG. 7.

The above mathematical relationship provides the most optimal combination of ball contact angle αB and axial spacing distance VS. However, any other combination of ball contact angle αB within the range of ten degrees (10°) and forty degrees (40°) and vertex axial spacing distance VS within the range of +/−7.5 mm from the spacing line segment midpoint ms provides enhanced performance of the wheel hub bearing unit 10.

With such a relative positioning of the rolling elements 16, 18 and particularly the angular orientation of the balls 16, the stiffness and friction of the hub bearing unit 10 are relatively less when the ball contact angle αB is more proximal to ten degrees (10°) and the vertex axial spacing distance VS is more proximal to negative seven and one-half millimeters (−7.5), indicating that the rolling element intersection vertex VE is located more proximal to the balls 16.

Alternatively, the bearing unit stiffness and friction are relatively greater when the ball contact angle αB is more proximal to forty degrees (40°) and the vertex axial spacing distance VS is more proximal to positive seven and one-half millimeters (+7.5 mm), indicating that the rolling element intersection vertex VE is located more distally from the balls 16, and thus relatively more proximal to the rollers 18.

However, less improvement of the product life or fatigue life of the wheel hub bearing unit 10 has been observed when both the ball contact angle αB is more proximal to 10° and the vertex axial spacing distance VS is more proximal to −7.5 mm and alternatively, greater improvement in the product/fatigue life of the unit 10 has been observed when both the ball contact angle αB is more proximal to 40° and the vertex axial spacing distance VS is more proximal to +7.5 mm. In any case, any combination of a ball contact angle αB within 10° and 40° and a vertex axial spacing distance VS within +/−7.5 mm provides the wheel hub bearing unit 10 with a beneficial combination of stiffness, friction and product life.

Figure 8:
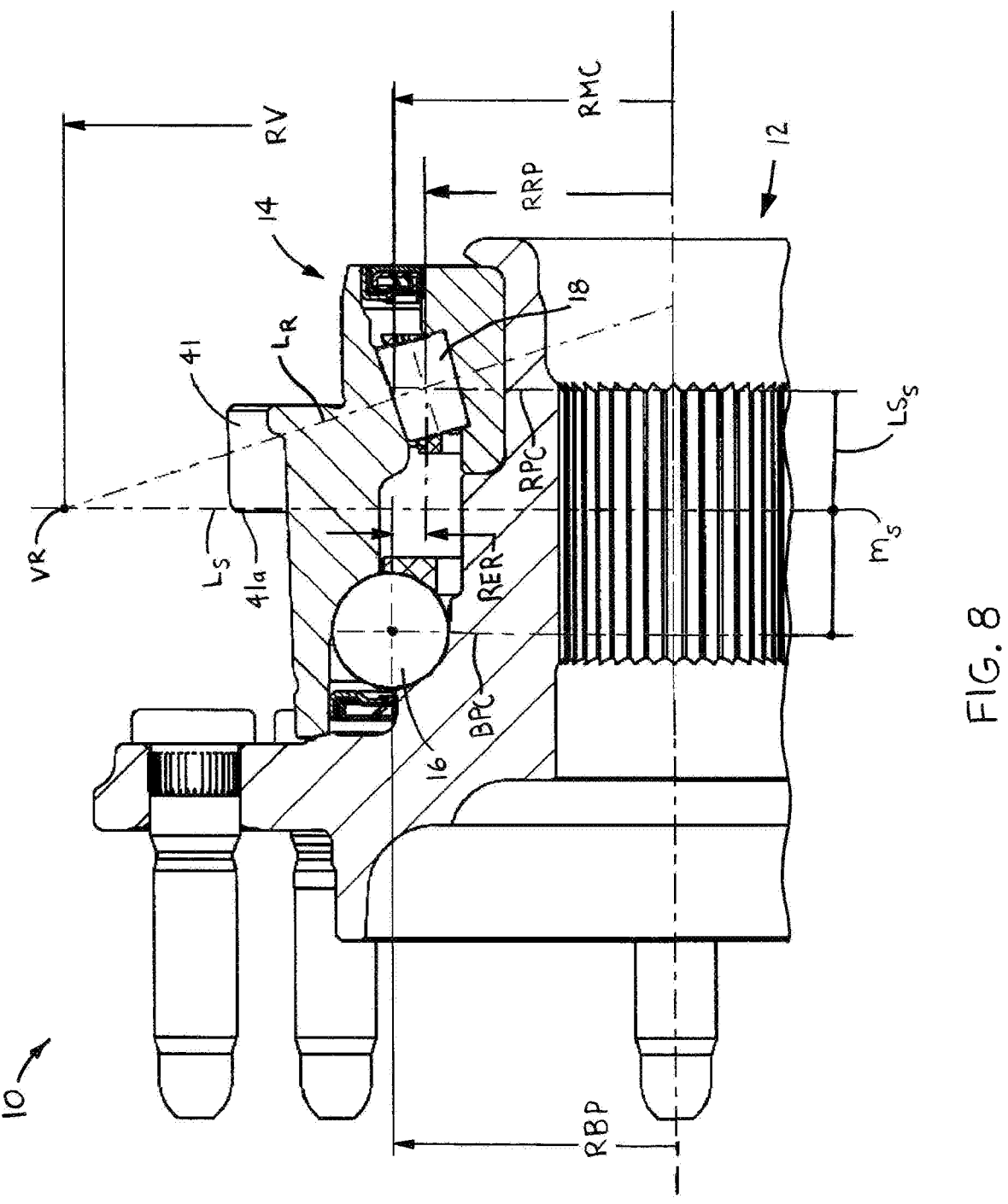
FIG. 8 is a broken-away, enlarged, axial cross-sectional view of an upper portion of the wheel hub bearing unit, including indications of a vertex defined by lines through a roller contact midpoint and a line through a midpoint of a spacing line segment and showing pitch circles of the balls and rollers.

Referring now to FIG. 8, to further optimize the wheel hub bearing unit 10, the hub 12 and the outer ring 14 are also preferably formed or constructed to position the rollers 18 in a manner that has been determined to best balance considerations of friction on the rolling elements 16, 18 and stiffness, mass and fatigue life of the wheel hub bearing unit 10. Specifically, the inner and outer ball raceways 26, 44 and the inner and outer roller raceways 30, 48 are configured such that a difference between the ball pitch circle radius RBP and the midpoint circle radius RMC, the "rolling element radius differential" or "RER differential" is between plus or minus five millimeters (+/−5 mm), i.e., no greater than five millimeters (5 mm). Additionally, the raceways 26, 44, 30 and 48 are also configured such that a vertex VR is defined at the intersection of each line L$_R$ extending through the midpoint circle MC perpendicular to the outer roller raceway 48 and a line Ls extending through the midpoint ms of, and perpendicular to, the spacing line segment LS$_S$, the vertex VR being spaced from the central axis A$_C$ by a radial spacing distance RV and a ratio of the vertex radial spacing distance RV to the midpoint circle radius RMC, or RV:RMC, the "vertex-roller radius ratio" or "VRR ratio", is between one and one-half (1.5) and three (3.0).

With such a relative positioning of the rolling elements 16, 18 and particularly the angular orientation of the rollers 18, the stiffness of the bearing assembly 10 is relatively greater and both friction and mass is relatively less when the RER differential is more proximal to negative five millimeters (−5 mm), indicating that the rollers 18 are spaced radially inwardly from the balls 16, and the VRR ratio is more proximal to 1.5, indicating a shallower contact angle of the rollers 18. Alternatively, the bearing assembly stiffness is relatively less and friction and mass are relatively greater when the RER differential is more proximal to positive 5 millimeters (+5 mm) and the VRR ratio is more proximal to 3.0, indicating a steeper contact angle of the rollers 18. However, less improvement in the product life or fatigue life has been observed when both the RER differential is more proximal to −5 mm and the VRR ratio is more proximal to 1.5 and conversely, greater improvement in product/fatigue life has been observed when both the RER differential is more proximal to +5 mm and the VRR ratio is more proximal to 3.0. In any case, any combination of the RER differential within the range of plus or minus five millimeters (+/−5 mm) and a VRR of between 1.5 and 3.0 gives the wheel hub bearing unit 10 a beneficial combination of stiffness, mass, friction and product life.

Referring to FIGS. 6-8, preferably, the outer axial end 41*a* of each outer ring flange 41 is located proximal to any line Ls extending perpendicularly through the midpoint ms of the spacing line segment LS*S*, with the inner axial end 41*b* being disposed between the flange outer axial end 41*a* and the inboard end 40*b* of the outer ring 14. Such a positioning of the outer ring flange(s) 40 reduces deflections in the wheel hub bearing unit 10 for a given bending moment exerted on each flange 41.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A wheel hub bearing unit for rotatably coupling a wheel with a vehicle, the wheel being rotatable about a central axis, the wheel hub bearing unit comprising:

a hub rotatable about the central axis and having an outboard axial end, an inboard axial end, an annular flange extending radially outwardly from the outboard axial end and configured to connect with the wheel, an outer circumferential groove providing a ball inner raceway and a frustoconical outer circumferential surface section spaced axially from the outer circumferential groove and providing a roller inner raceway;

an outer ring disposed about the hub and configured to connect with the vehicle, the outer ring having an inner circumferential groove providing a ball outer raceway and a frustoconical inner circumferential surface section spaced axially from the inner circumferential groove and providing a roller outer raceway, the roller outer raceway having first and second axial ends and a midpoint circle centered between the first and second axial ends and extending about the central axis;

a plurality of balls disposed between the hub and the outer ring so as to be rollable upon the ball inner and outer raceways to traverse a pitch circle extending through the center of each ball and about the central axis, each ball contacting the hub groove at an inner contact point and contacting the outer ring groove at an outer contact point, a line extending through each ball inner contact point and each ball outer contact point defining a ball contact angle with a line perpendicular to the central axis; and a plurality of tapered rollers disposed between the hub and the outer ring so as to be rollable upon the roller inner and outer raceways to traverse a pitch circle extending through a center of each roller and about the central axis, the roller pitch circle being spaced from the ball pitch circle by a spacing line segment along the central axis;

wherein the inner and outer ball raceways are each configured such that the ball contact angle has a value between ten degrees) (10° and forty degrees) (40° and the inner and outer ball raceways and the inner and roller outer raceways are each configured such that each line extending through the ball inner and outer contact points intersects with a line extending through the midpoint circle perpendicular to the roller outer raceway at a vertex, the vertex being spaced from a midpoint of the spacing line segment by an axial distance of no greater than seven and one-half millimeters (7.5 mm).

2. The wheel hub bearing unit as recited in claim 1, wherein:

each line extending through the midpoint circle perpendicular to the roller outer raceway defines a roller contact angle with a line perpendicular to the central axis;

the roller pitch circle has a radius about the central axis; and the axial spacing distance of the vertex from the midpoint of the spacing line segment for a particular value of the ball contact angle is calculated as follows:

$$VS = \left[ \frac{RBP - RRP + \left( LS \times \tan\!\left(\frac{\pi}{2} - \alpha R\right)\right)}{\tan\!\left(\frac{\pi}{2} - \alpha B\right) + \tan\!\left(\frac{\pi}{2} - \alpha R\right)} \right] - \frac{LS}{2}$$

wherein:

VS is the axial spacing distance of the vertex from the midpoint of the spacing line segment in millimeters, the vertex being spaced from the spacing line segment midpoint toward the rollers when the value of VS is positive and spaced from the spacing line segment midpoint toward the balls when the value of VS is negative;

RBP is the radius of the ball pitch circle;

RRP is the radius of the roller pitch circle;

LS is the length of the spacing line segment in millimeters;

x indicates multiplication;

αB is the value of the ball contact angle in radians; and

αR is the value of the roller contact angle in radians.

3. The wheel hub bearing unit as recited in claim 1, wherein:

the outer circumferential groove of the hub has a section facing toward the inboard axial end and the frustoconical outer circumferential surface of the hub faces toward the outboard axial end; and the outer ring has an outboard axial end and an inboard axial end, the outboard axial end of the outer ring being disposed adjacent to the hub flange, the inner circumferential groove of the outer ring being spaced axially from and having a section facing toward the outboard axial end and the frustoconical inner surface of the outer ring is spaced axially from faces toward the inboard axial end.

4. The wheel hub bearing unit as recited in claim 1, wherein the hub has a cylindrical main body portion and an annular ring disposed about the main body portion adjacent to the inboard axial end, the annular ring having an outer circumferential surface including the outer frustoconical surface providing the inner roller race.

5. The wheel hub bearing unit as recited in claim 1, wherein the outer ring has an outer circumferential surface and an annular flange extending radially outwardly from the outer circumferential surface, the outer ring flange being configured to connect with a steering knuckle or a suspension member of the vehicle.

6. The wheel hub bearing unit as recited in claim 5, wherein the flange of the outer ring has outer and inner axial ends, the outer axial end of the flange being located adjacent to any line extending through the midpoint of the spacing line segment and perpendicular to the spacing line segment, the inner axial end being disposed between the outer axial end and the inboard end of the outer ring.

7. The wheel hub bearing unit as recited in claim 1, wherein the inner and outer ball raceways and the roller inner and outer raceways are configured such that a difference between the ball pitch circle radius and the midpoint circle radius is no greater than five millimeters (5 mm).

8. The wheel hub bearing unit as recited in claim 7, wherein a roller vertex is defined at the intersection of each line extending through the midpoint circle perpendicular to the roller outer raceway and a line extending through the midpoint of and perpendicular to the spacing line segment, the roller vertex being spaced from the central axis by a radial spacing distance and a ratio of the roller vertex radial spacing distance to the midpoint circle radius is between 1.5 and 3.0.

9. The wheel hub bearing unit as recited in claim 1, wherein a roller vertex is defined at the intersection of each line extending through the midpoint circle perpendicular to the roller outer raceway and a line extending through the midpoint of and perpendicular to the spacing line segment, the roller vertex being spaced from the central axis by a radial spacing distance and a ratio of the roller vertex radial spacing distance to the midpoint circle radius is between 1.5 and 3.0.

* * * * *